United States Patent
Kang (10) Patent No.: US 11,355,075 B2
(45) Date of Patent: Jun. 7, 2022

(54) DISPLAY DEVICE AND METHOD FOR DRIVING SAME

(71) Applicants: HKC CORPORATION LIMITED, Shenzhen (CN); CHONGQING HKC OPTOELECTRONICS TECHNOLOGY CO., LTD., Chongqing (CN)

(72) Inventor: Chih Tsung Kang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 17/041,690

(22) PCT Filed: Nov. 8, 2018

(86) PCT No.: PCT/CN2018/114468
§ 371 (c)(1),
(2) Date: Sep. 25, 2020

(87) PCT Pub. No.: WO2020/056885
PCT Pub. Date: Mar. 26, 2020

(65) Prior Publication Data
US 2021/0012720 A1 Jan. 14, 2021

(30) Foreign Application Priority Data
Sep. 18, 2018 (CN) .......................... 201811088543.8

(51) Int. Cl.
| | | |
|---|---|---|
| G09G 3/34 | (2006.01) | |
| G02F 1/13357 | (2006.01) | |
| G09G 3/20 | (2006.01) | |

(52) U.S. Cl.
CPC ....... *G09G 3/342* (2013.01); *G02F 1/133602* (2013.01); *G09G 3/2003* (2013.01);
(Continued)

(58) Field of Classification Search
CPC ...... G02F 1/133602; G09G 2300/0452; G09G 2320/0233; G09G 2340/14;
(Continued)

(56) References Cited

U.S. PATENT DOCUMENTS

2019/0019464 A1* 1/2019 Xing .................... G09G 3/2022
2019/0101796 A1* 4/2019 Chen ................. G02F 1/133611
(Continued)

FOREIGN PATENT DOCUMENTS

| CN | 1971696 A | 5/2007 |
|---|---|---|
| CN | 101281730 A | 10/2008 |

(Continued)

OTHER PUBLICATIONS

International Search Report from International Application No. PCT/CN2018/114468 dated May 29, 2019.

*Primary Examiner* — Kenneth Bukowski
(74) *Attorney, Agent, or Firm* — Hauptman Ham, LLP (57) ABSTRACT

A display device (300) comprises a display panel (310), a backlight module (320), and a driving circuit (330). The backlight module (320) comprises a backlight source and a partition control unit. The partition control unit is used to partition the backlight source into a plurality of regions, and to independently control the luminance of each colored light source at each region. The driving circuit (330) is used to: acquire an input signal of each given image to be displayed; display said image by means of two sub-frames at the front and the back thereof; determine, according to a driving voltage of pixels corresponding to each region, a magnitude of a backlight brightness compensation signal of each region; and adjust, according to the backlight brightness compensation signal, the luminance of each region.

14 Claims, 4 Drawing Sheets

(52) U.S. Cl.
CPC ............ *G09G 2300/0452* (2013.01); *G09G 2320/0233* (2013.01)

(58) Field of Classification Search
CPC ........... G09G 2340/16; G09G 2360/16; G09G 3/2003; G09G 3/342; G09G 3/3426
See application file for complete search history.

(56) References Cited

U.S. PATENT DOCUMENTS

| | | | |
|---|---|---|---|
| 2020/0273414 A1* | 8/2020 | He | G09G 3/2044 |
| 2021/0027723 A1* | 1/2021 | Kang | G09G 3/3426 |

FOREIGN PATENT DOCUMENTS

| | | | |
|---|---|---|---|
| CN | 103514839 A | | 1/2014 |
| CN | 104658502 A | | 5/2015 |
| CN | 106782375 A | | 5/2017 |
| CN | 106782377 A | | 5/2017 |
| CN | 107978282 A | | 5/2018 |
| CN | 108122544 A | | 6/2018 |
| JP | H1173898 A | | 3/1999 |
| JP | 2002149132 A | | 5/2002 |
| JP | 2004013120 A | | 1/2004 |

* cited by examiner

DISPLAY DEVICE AND METHOD FOR DRIVING SAME

TECHNICAL FIELD

This application relates to displays, and more particularly, to a display device and a method for driving same.

BACKGROUND

Vertical alignment (VA) type liquid crystal display is a common liquid crystal display. The brightness of the VA type liquid crystal display saturates rapidly along with a driving voltage in a large-viewing-angle, resulting in relatively serious color cast, and further affecting the image quality.

An improvement solution is that each frame of image is displayed by a front sub-frame and a rear-sub-frame (for example, a 60 Hz image is displayed by a front 120 Hz sub-frame and a rear 120 Hz sub-frame), a pixel driving voltage of one sub-frame is a high voltage, and a pixel driving voltage of the other sub-frame is a low voltage.

However, according to the solution, when a difference between the high voltage and the low voltage is large, human eyes can obviously feel flicker caused by a brightness difference between the two sub-frames.

SUMMARY

According to various embodiments of this application, a display device and a driving method thereof are provided.

A driving method for a display device, including: dividing a backlight source of a display device into a plurality of regions, the pixels of the display device being divided into blocks in a one-to-one correspondence to the regions of the backlight source; the backlight source includes light sources of a plurality of colors; independently controlling the emergent light brightness of the light source of each color in each of the regions with a regional control unit; acquiring an input signal of each frame of image to be displayed; displaying each frame of image by a front sub-frame and a rear sub-frame, the driving voltage of the pixel of one sub-frame being higher than the driving voltage of the same pixel in the other sub-frame; determining, according to the driving voltage of the pixel corresponding to each of the regions, the amplitude of backlight brightness compensation signals of the light source of each color in each of the regions respectively corresponding to the two sub-frames; the higher the driving voltage is, the weaker the backlight brightness compensation signal is, and the lower the driving voltage is, the stronger the backlight brightness compensation signal is, so as to alleviate the brightness difference of a same pixel between the two sub-frames; and adjusting the emergent light brightness of the light source of each color in each region according to the backlight brightness compensation signal.

A driving method for a display device, including: dividing a red-green-blue three-color backlight source of the display device into a plurality of regions, the pixels of the display device being divided into blocks in a one-to-one correspondence to the regions of the backlight source; independently controlling the emergent light brightness of the light source of each color in each of the regions by a regional control unit; acquiring an input signal of each frame of image to be displayed; acquiring a reference backlight brightness signal corresponding to each frame of image; displaying each frame of image by a front sub-frame and a rear sub-frame, the driving voltage of the pixel of one sub-frame being higher than the driving voltage of the same pixel in the other sub-frame; collecting statistics on the maximum signal and the minimum signal of the sub-pixel of each color in the input signal of each frame of image in each of the blocks; respectively acquiring the driving voltage of the maximum signal of the sub-pixel of each color, the driving voltage of one sub-frame being marked as a first driving voltage, and the driving voltage of another sub-frame being marked as a second driving voltage; respectively acquiring the driving voltage of the minimum signal of the sub-pixel of each color, the driving voltage of one sub-frame being marked as a third driving voltage, and the driving voltage of another sub-frame being marked as a fourth driving voltage; and the backlight brightness compensation signal is computed according to the following formulae:

for a red sub-pixel:

$$L_{RL} < L < L_{RH};$$

$$R_{TH} \times L + R_{TL} \times L = R_{TH} \times L_{RL} + R_{TL} \times L_{RH}; \text{ and}$$

$$R'_{TH} \times L + R'_{TL} \times L = R'_{TH} \times L_{RL} + R'_{TL} \times L_{RH};$$

wherein $L_{RL}$ is the sub-frame with relatively weak red sub-pixel backlight brightness compensation signal in two sub-frames of each frame of image, $L_{RH}$ is the sub-frame with relatively strong red sub-pixel backlight brightness compensation signal, $R_{TH}$ is the first driving voltage of the red sub-pixel, $R_{TL}$ is the second driving voltage, $R'_{TH}$ is the third driving voltage, $R'_{TL}$ is the fourth driving voltage, and L is the reference backlight brightness signal;

for a green sub-pixel:

$$L_{GL} < L < L_{GH};$$

$$G_{TH} \times L + G_{TL} \times L = G_{TH} \times L_{GL} + G_{TL} \times L_{GH}; \text{ and}$$

$$G'_{TH} \times L + G'_{TL} \times L = G'_{TH} \times L_{GL} + G'_{TL} \times L_{GH};$$

wherein $L_{GL}$ is the sub-frame with relatively weak green sub-pixel backlight brightness compensation signal in two sub-frames of each frame of image, $L_{GH}$ is the sub-frame with relatively strong green sub-pixel backlight brightness compensation signal, $G_{TH}$ is the first driving voltage, $G_{TL}$ is the second driving voltage, $G'_{TH}$ is the third driving voltage, and $G'_{TL}$ is the fourth driving voltage;

for a blue sub-pixel:

$$L_{BL} < L < L_{BH};$$

$$B_{TH} \times L + B_{TL} \times L = B_{TH} \times L_{BL} + B_{TL} \times L_{BH}; \text{ and}$$

$$B'_{TH} \times L + B'_{TL} \times L = B'_{TH} \times L_{BL} + B'_{TL} \times L_{BH};$$

wherein $L_{BL}$ is the sub-frame with relatively weak blue sub-pixel backlight brightness compensation signal in two sub-frames of each frame of image, $L_{BH}$ is the sub-frame with relatively strong blue sub-pixel backlight brightness compensation signal, $B_{TH}$ is the first driving voltage, $B_{TL}$ is the second driving voltage, $B'_{TH}$ is the third driving voltage, and $B'_{TL}$ is the fourth driving voltage; and adjusting the emergent light brightness of the light source of each color in each region according to the backlight brightness compensation signal of the light source of each color.

A display device, including: a display panel; a backlight module, including a backlight source and a regional control unit, the backlight source including light sources of a plurality of colors, the regional control unit is configured to divide the backlight source into a plurality of regions and independently control the emergent light brightness of each light source in each region, and pixels in the display panel are divided into blocks in a one-to-one correspondence to the regions of the backlight module; and a driving circuit, including an input module configured to acquire an input signal of each frame of image to be displayed; a high and low voltage framing display module configured to display each frame of image by a front sub-frame and a rear sub-frame, the driving voltage of the pixel of one sub-frame being higher than the driving voltage of the same pixel in the other sub-frame; a backlight compensation determination module configured to determine, according to the driving voltage of the pixel corresponding to each of the region, the amplitude of backlight brightness compensation signals of the light source of each color in each of the regions respectively corresponding to the two sub-frames; the higher the driving voltage is, the weaker the backlight brightness compensation signal is, and the lower the driving voltage is, the stronger the backlight brightness compensation signal is, so as to alleviate the brightness difference of a same pixel between the two sub-frames; and a backlight brightness adjustment module, which is used for adjusting the emergent light brightness of the light source of each color in each region according to the backlight brightness compensation signal.

According to the display device and the driving method thereof, each frame of image is displayed by a front sub-frame and a rear sub-frame, driving voltages of the same pixel in the two sub-frames are respectively a high voltage and a low voltage, and backlight brightness of the two sub-frames is respectively dark and bright, so as to alleviate the brightness difference of the same pixel between the two sub-frames, and further reduce the flickering phenomenon caused by fluctuation of the driving voltages of the two sub-frames. The regional control unit divides the backlight module into a plurality of regions which are capable of independently controlling emergent light brightness, and correspondingly can perform independent backlight brightness compensation on pixels of different blocks on the display panel, and thus has a better anti-flickering effect in comparison with a backlight module adopting a uniform backlight brightness. Furthermore, by adopting the driving method for the display device, the pixel of the liquid crystal display does not need to be divided into main sub-pixel and secondary sub-pixel, and therefore, the process complexity of the display panel is greatly reduced, the penetration rate and the resolution of the liquid crystal display panel are greatly promoted, and the cost of backlight design is reduced.

DETAILED DESCRIPTION OF THE EMBODIMENTS

To help understand this application, this application will be fully described with reference to the accompanying drawings. The accompanying drawings illustrate embodiments of this application. However, this application can be implemented in various different forms, and is not limited to the embodiments described herein. On the contrary, the embodiments are described for the purpose of providing a more thorough and comprehensive understanding of the contents disclosed by this application.

Unless otherwise defined, all technical and scientific terms used herein have the same meaning as commonly understood by persons skilled in the art to which this application pertains. The terminology used in the description of this application herein is for describing particular embodiments only and is not intended to be limiting of this application. As used herein, the term "and/or" includes any and all combinations of one or more of the associated listed items.

It should be noted that when an element is referred to as being "fixed" or "fastened" to another element, it can be directly fixed or fastened to the other element or intervening elements may also be present. When an element is referred to as being "coupled" or "connected" to another element, it can be directly coupled or connected to the other element or intervening elements may also be present. As used herein, the terms, such as "vertical", "horizontal", "under", "upper", "lower", "left", "right", and the like, are used for the purpose of description only.

Display devices to which a driving method for a display device disclosed by this application is applicable may be liquid crystal displays of TN (twisted nematic), VA (vertical alignment), OCB (optical compensated bend) and other types, but are not limited thereto. Downright or broadside backlight may be applied as backlight of the liquid crystal display, and the backlight source is an RGB three-color backlight source. The driving method is also applicable to the situation that the liquid crystal display is a curved screen, as well as the situation of an RGBW backlight source and an RGBY backlight source.

Figure 2:
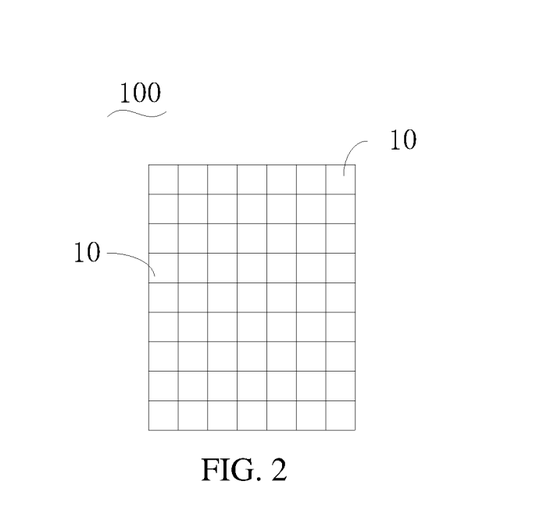
FIG. 2 is a schematic diagram of a backlight module of a liquid crystal display applicable to a driving method for a display device in an embodiment.

FIG. 2 is a schematic diagram of a backlight module of a display device applicable to a driving method for a display device, and the backlight module 100 includes a backlight source and a regional control unit. Light of the backlight source enables the backlight module 100 to present a plurality of regions 10 (in this embodiment, the quantity is 9*7=63) in matrix arrangement under the control of the regional control unit, emergent light brightness of the light source of each color is independently controlled by the regional control unit in each region 10, and emergent light enters human eyes after passing through a display panel of a liquid crystal display. The display panel is divided into blocks according to the condition that which pixels on the display panel will be irradiated by the emergent light of each region 10, and the blocks are in a one-to-one correspondence to the regions 10 of the backlight module. For example, in the embodiment shown in FIG. 2, the display panel is divided into 63 blocks.

Figure 1:
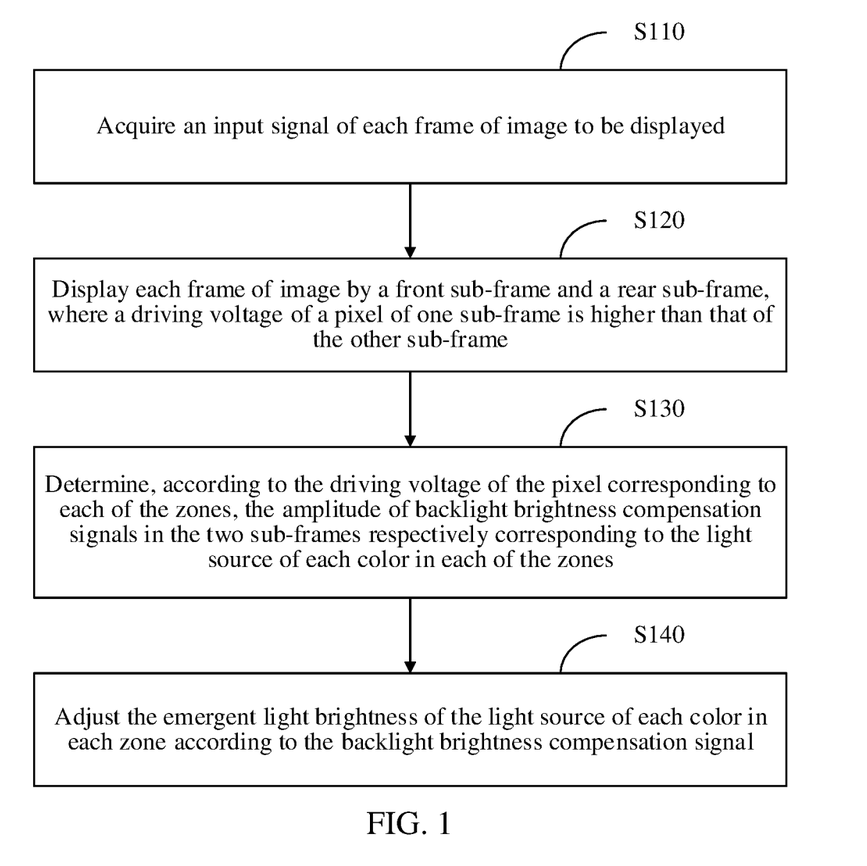
FIG. 1 is a flowchart of a driving method for a display device in an embodiment.

FIG. 1 is a flowchart of a driving method for the display device in an embodiment, including the following steps.

S110. Acquire an input signal of each frame of image to be displayed.

A liquid crystal display acquires the input signal of each frame of image to be displayed from external equipment, for example, a graphics processing unit (GPU). The liquid crystal display may also obtain a reference backlight brightness (which is used for controlling emergent light brightness of a backlight source, and can be represented by a reference backlight brightness signal) according to the input signal, and the brightness is backlight brightness of the backlight source when backlight compensation is not performed.

S120. Display each frame of image by a front sub-frame and a rear sub-frame, a driving voltage of a pixel of one sub-frame being higher than that of the other sub-frame.

Each frame of image is displayed by a front sub-frame and a rear sub-frame, that is, one frame of image is segmented into two frames of images in time sequence, which are respectively marked as a first sub-frame and a second sub-frame, and an image corresponding to the input signal is displayed to a user by the mutual compensation of the first sub-frame and the second sub-frame. In this embodiment, a driving voltage of each pixel on the first sub-frame is higher than a driving voltage of a corresponding sub-pixel on the second sub-frame. That is, the first sub-frame is driven by adopting a high driving voltage, and the second sub-frame is driven by adopting a low driving voltage lower than that of the first sub-frame. A driving voltage of each sub-pixel of the first sub-frame and a driving voltage of each sub-pixel of the second sub-frame may be searched and obtained via a Look Up Table (LUT). Specifically, the LUT is stored in a frame buffer in advance in the liquid crystal display. The LUT is a corresponding relationship table of a voltage of the input signal and the driving voltage of each sub-pixel of the first sub-frame and the second sub-frame that are corresponding to the input signal. Taking a 8-bit driving voltage signal as an example, the color gray value 0-255 of each R/G/B input signal corresponds to 256 pairs of high and low voltage signals, totally 3*256 pairs of high voltage signals $R_{TH}/G_{TH}/B_{TH}$ and low voltage signals $R_{TL}/G_{TL}/B_{TL}$. Therefore, a corresponding high driving voltage and a corresponding low driving voltage may be searched according to the color gray value of each sub-pixel in the input signal, so as to take the high driving voltage as the driving voltage of the sub-pixel in the first sub-frame, and take the corresponding low driving voltage as the driving voltage of the sub-pixel in the second sub-frame.

S130. Determine the amplitude of backlight brightness compensation signals in the two sub-frames respectively corresponding to the light source of each color in each of the regions.

The amplitude of the backlight brightness compensation signal of the light source of each color in each region of the backlight module is determined according to the amplitude of the driving voltage of the pixel of the corresponding block, a higher driving voltage indicates a weaker the backlight brightness compensation signal, and a lower driving voltage indicates a stronger the backlight brightness compensation signal. For two sub-frames with different driving voltages of the same frame of image, the amplitude of the backlight brightness compensation signals are different, the first sub-frame with a high driving voltage is compensated by a relatively dark backlight brightness compensation signal, the second sub-frame with a low driving voltage is compensated by a relatively bright backlight brightness compensation signal, so as to alleviate the brightness difference of the same pixel between two sub-frames of each frame of image. It may be understood that for two sub-frames with a high driving voltage and a low driving voltage, when the brightness of the same pixel is kept unchanged by the backlight brightness compensation signals, flicker caused by a difference value of the driving voltages may be completely eliminated. However, the difference values of driving voltages of different pixels may be different, and it is hard to perform separate backlight brightness compensation on each pixel. The backlight module in this embodiment includes a plurality of regions which are capable of independently controlling emergent light brightness, and correspondingly can perform independent backlight brightness compensation on pixels of different blocks on the display panel, and thus has a better anti-flickering effect in comparison with a backlight module adopting a uniform backlight brightness.

S140. Adjust the emergent light brightness of the light source of each color in each region according to the backlight brightness compensation signal.

Since each frame of image is displayed by a first sub-frame with a high driving voltage and a second sub-frame with a low driving voltage, emergent light brightness of the backlight module may be correspondingly low brightness and high brightness, which correspondingly compensate the first sub-frame and the second sub-frame respectively. Since the emergent light brightness of the light source of each color in each region of the backlight module is independently controlled, and the driving voltage of the pixel of each block of the display panel is different, the backlight brightness compensation signal, and even the emergent light brightness, in each region may also be different. If a difference value between the driving voltages of the first sub-frame and the second sub-frame is relatively small, for a light source of any color, the difference between the amplitude of the backlight brightness compensation signals of the two sub-frames computed in step S130 is small. In some embodiments, when the difference value of the driving voltages of the first sub-frame and the second sub-frame is smaller than a preset backlight brightness compensation threshold, a backlight brightness compensation mechanism is not started, and the backlight module performs luminescence control directly by adopting the reference backlight brightness. In another embodiment, alternatively, when the difference value of the backlight brightness compensation signals of the two sub-frames is smaller than the preset backlight brightness compensation threshold, the backlight brightness compensation mechanism is not started.

According to the driving method for the display device, each frame of image is displayed by a front sub-frame and a rear sub-frame, the driving voltages of the same pixel in the two sub-frames are respectively a high voltage and a low voltage, and the backlight brightness of the two sub-frames is respectively dark and bright, so as to alleviate the brightness difference of the same pixel between the two sub-frames, and reduce the flickering phenomenon caused by fluctuation of the driving voltages of the two sub-frames. The regional control unit divides the backlight module into a plurality of regions which are capable of independently controlling emergent light brightness, and correspondingly can perform independent backlight brightness compensation on pixels in different regions on the display panel, and thus has a better anti-flickering effect in comparison with a backlight module adopting uniform backlight brightness. Furthermore, by adopting the driving method for the display device, the pixel of the liquid crystal display does not need to be divided into a main sub-pixel and a secondary sub-pixel, and therefore, the process complexity of the display panel is greatly reduced, a penetration rate and the resolution of the liquid crystal display panel are greatly promoted, and the costs of backlight design are reduced.

In some embodiments, step S140 is to perform backlight brightness compensation on a next frame of image, so that the backlight brightness of the sub-frame with a relatively high driving voltage in two sub-frames of the next frame of image is weaker than the reference backlight brightness, and the backlight brightness of the other sub-frame is stronger than the reference backlight brightness. That is, the backlight brightness of the currently displayed frame of image is computed according to the previous frame of image. Since two adjacent frames of images are basically the same, backlight brightness compensation for the current frame of image according to the previous frame of image is appropriate.

Figure 3:
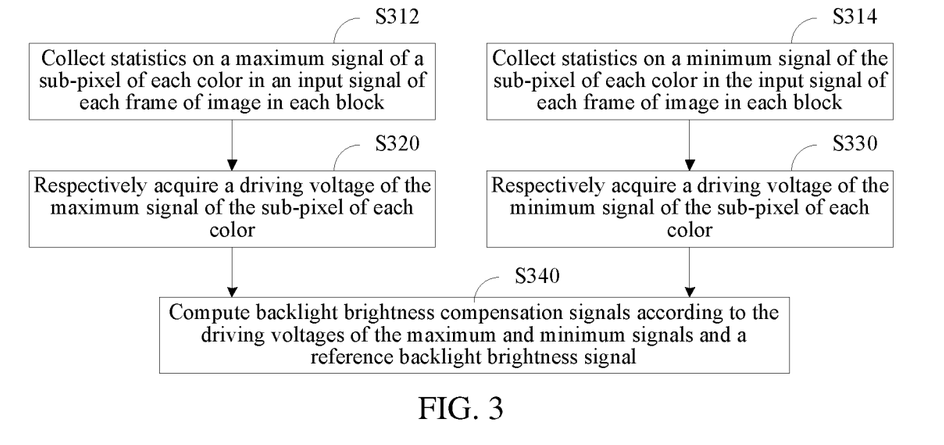
FIG. 3 is a flowchart of sub-steps of step S130 in an embodiment.

In some embodiments, step S130 is implemented according to the following manners.

S310. Collect statistics on the maximum signal and the minimum signal of a sub-pixel of each color in the input signal of each frame of image in each of the regions.

Referring to FIG. 3, step S310 is further divided into step S312 of collecting statistics on the maximum signal and step S314 of collecting statistics on the minimum signal. A liquid crystal display totally has sub-pixels of three colors, including green sub-pixels, red sub-pixels and blue sub-pixels, that is, in step S310, statistics collection is performed on the maximum signal and the minimum signal of the red sub-pixel in each block, the maximum signal and the minimum signal of the green sub-pixel in each block and the maximum signal and the minimum signal of the blue sub-pixel in each block. The maximum signal of the sub-pixel of one color may be the maximum value of the color gray scale of the color, and the minimum signal may be the minimum value of the color gray scale of the color.

S320. Respectively acquire the driving voltage of the maximum signal of the sub-pixel of each color.

The followings are acquired via the LUT: the driving voltage $R_{TH}$ of the first sub-frame and the driving voltage $R_{TL}$ of the second sub-frame corresponding to the maximum signal of the red sub-pixel, the driving voltage $G_{TH}$ of the first sub-frame and the driving voltage $G_{TL}$ of the second sub-frame corresponding to the maximum signal of the green sub-pixel, and the driving voltage $B_{TH}$ of the first sub-frame and the driving voltage $B_{TL}$ of the second sub-frame corresponding to the maximum signal of the blue sub-pixel of each block.

S330. Respectively acquire the driving voltage of the minimum signal of the sub-pixel of each color.

The followings are acquired via the LUT: the driving voltage $R'_{TH}$ of the first sub-frame and the driving voltage $R'_{TL}$ of the second sub-frame corresponding to the minimum signal of the red sub-pixel, the driving voltage $G'_{TH}$ of the first sub-frame and the driving voltage $G'_{TL}$ of the second sub-frame corresponding to the minimum signal of the green sub-pixel, and the driving voltage $B'_{TH}$ of the first sub-frame and the driving voltage $B'_{TL}$ of the second sub-frame corresponding to the minimum signal of the blue sub-pixel of each block. Step S320 is performed after S312, step S330 is performed after S314, the procedure from steps S312 to S320 and the procedure from steps S314 to S330 are two parallel procedures, and there is no requirement on the sequence of the two parallel procedures.

S340. Compute the backlight brightness compensation signals according to the driving voltages of the maximum and minimum signals and the reference backlight brightness signal.

The backlight brightness compensation signal $L_{RL}$ of the first sub-frame and the backlight brightness compensation signal $L_{RH}$ of the second sub-frame of the red sub-pixel, the backlight brightness compensation signal $L_{GL}$ of the first sub-frame and the backlight brightness compensation signal $L_{GH}$ of the second sub-frame of the green sub-pixel and the backlight brightness compensation signal $L_{BL}$ of the first sub-frame and the backlight brightness compensation signal $L_{BH}$ of the second sub-frame of the blue sub-pixel are respectively computed according to the first driving voltage $R_{TH}$, the second driving voltage $R_{TL}$, the third driving voltage $R'_{TH}$ and the fourth driving voltage $R'_{TL}$ of the red sub-pixel, the first driving voltage $G_{TH}$, the second driving voltage $G_{TL}$, the third driving voltage $G'_{TH}$ and the fourth driving voltage $G'_{TL}$ of the green sub-pixel, the first driving voltage $B_{TH}$, the second driving voltage $B_{TL}$, the third driving voltage $B'_{TH}$ and the fourth driving voltage $B'_{TL}$ of the blue sub-pixel, and the reference backlight brightness signal L.

In some embodiments, the computation formula of the backlight brightness compensation signal $L_{RL}/L_{RH}$ corresponding to the red sub-pixel is as follows:

$$L_{RL} < L < L_{RH} \tag{1}$$

$$R_{TH} \times L + R_{TL} \times L = R_{TH} \times L_{RL} + R_{TL} \times L_{RH} \tag{2; and}$$

$$R'_{TH} \times L + R'_{TL} \times L = R'_{TH} \times L_{RL} + R'_{TL} \times L_{RH} \tag{3}$$

The computation formula of the backlight brightness compensation signal $L_{GL}/L_{GH}$ corresponding to the green sub-pixel is as follows:

$$L_{GL} < L < L_{GH} \tag{4}$$

$$G_{TH} \times L + G_{TL} \times L = G_{TH} \times L_{GL} + G_{TL} \times L_{GH} \tag{5; and}$$

$$G'_{TH} \times L + G'_{TL} \times L = G'_{TH} \times L_{GL} + G'_{TL} \times L_{GH} \tag{6}$$

The computation formula of the backlight brightness compensation signal $L_{BL}/L_{BH}$ corresponding to the blue sub-pixel is as follows:

$$L_{BL} < L < L_{BH} \tag{7}$$

$$B_{TH} \times L + B_{TL} \times L = B_{TH} \times L_{BL} + B_{TL} \times L_{BH} \tag{8; and}$$

$$B'_{TH} \times L + B'_{TL} \times L = B'_{TH} \times L_{BL} + B'_{TL} \times L_{BH} \tag{9}$$

By solving formulae (1)-(3), a plurality of groups of backlight brightness compensation signals $L_{RL}$ and $L_{RH}$ meeting the requirement may be obtained, similarly, by solving formulae (4)-(6), a plurality of groups of $L_{GL}$ and $L_{GH}$ may be obtained, and by solving formula (7)-(9), a plurality of groups of $L_{BL}$ and $L_{BH}$ may be obtained. Therefore, corresponding subsidiary conditions may be added to determine one of the groups as a most ideal compensation value. For example, the compensation signal is determined by defining a scope of the difference value between the backlight brightness compensation signals $L_{RL}$ and $L_{RH}$. In this embodiment, whether the difference value between the first driving voltage and the second driving voltage is greater than the backlight brightness compensation threshold needs to be determined in the computation process, that is, for the red sub-pixel, the following conditional expression should be met:

$$R_{TH} - R_{TL} > X \tag{10}$$

When the conditional expression (10) is not met, that is, when the difference of the driving voltages is not greater than the backlight brightness compensation threshold X, backlight brightness compensation is not started, and the backlight brightness of the liquid crystal display is kept at a reference backlight brightness L, so as to avoid backlight compensation to the backlight brightness even when the difference of the voltage signals is relatively small, reduce the complexity in the driving process, and improve the stability of the system. For the green sub-pixel and the blue sub-pixel, the following conditional expressions should be respectively met:

$$G_{TH} - G_{TL} > X \tag{11}$$

$$B_{TH} - B^{TL} > X \tag{12}$$

In the foregoing embodiments, X in formula (10), (11) and (12) is equal, that is, the red, green and blue sub-pixels adopt the same backlight brightness compensation threshold. It may be understood that in other embodiments, the red, green and blue sub-pixels may also adopt different backlight brightness compensation thresholds respectively.

It may be understood that because the backlight module includes a plurality of regions which are capable of independently controlling emergent light brightness, independent backlight brightness compensation is performed on pixels of different blocks on the display panel, and therefore, emergent light brightness in these regions is different, and the emergent light brightness difference between adjacent regions enables naked eyes to be capable of perceiving the phenomenon of non-uniform brightness. To resolve or alleviate the defect, in some embodiments, before step S140, the method further includes a step of adjusting the backlight brightness compensation signal of each region so as to alleviate the emergent light brightness difference between adjacent regions. Further, in some embodiments, the adjustment is implemented by spatial low-pass smoothing filtering processing. After spatial low-pass smoothing filtering processing, the difference between the backlight brightness compensation values of the regions is not excessively large, and therefore, the phenomena of non-uniform brightness and flickering caused by a great emergent light difference of adjacent regions are avoided.

Figure 4:
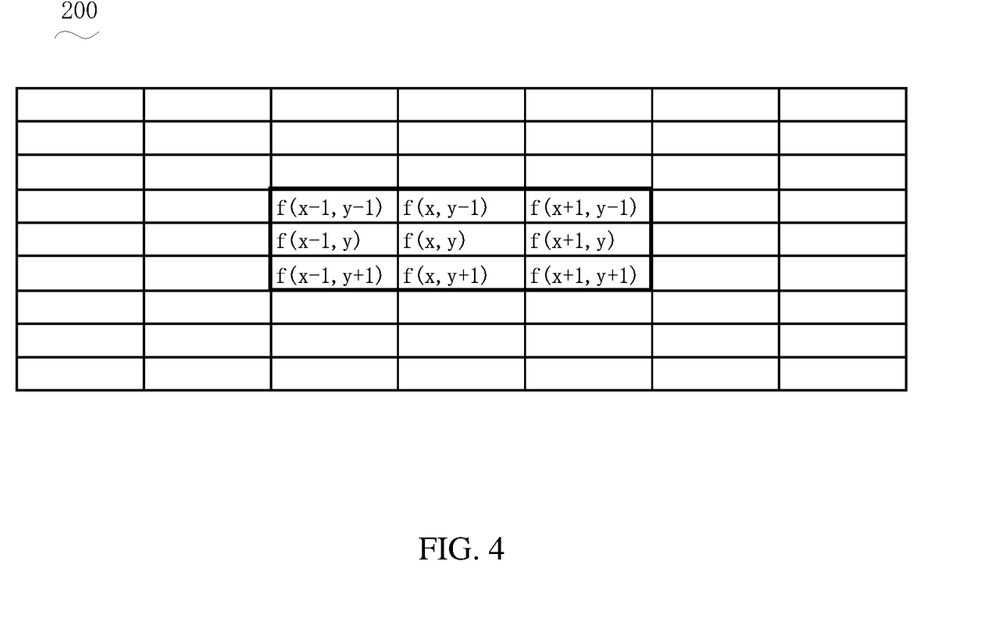
FIG. 4 is a schematic diagram of performing spatial low-pass smoothing filtering processing on a backlight compensation value in an embodiment.

Spatial low-pass smoothing filtering processing is equivalent to evaluation of the emergent light brightness of other regions around each region of the backlight module, and then the backlight brightness compensation value of the regions is adjusted correspondingly. It may be understood that because two sub-frames of one frame of image respectively correspond to one backlight brightness compensation signal, spatial low-pass smoothing filtering processing needs to be performed on these two backlight brightness compensation signals respectively (the processing principles of the two signals are the same). By taking the backlight module 200 of the 9*7=63 regions as shown in FIG. 4 as an example, explanation is made to the spatial low-pass smoothing filtering processing of the backlight brightness compensation signal corresponding to the first sub-frame: assuming that the backlight brightness compensation value computed in the region marked with f(x,y) in the diagram is f(x,y), with x, y respectively representing a horizontal coordinate and a vertical coordinate, because each region includes an RGB three-color light source, f(x,y) is relevant to the backlight brightness compensation signals $L_{RL}$, $L_{GL}$, $L_{BL}$ of the three-color light source, and during spatial low-pass smoothing filtering processing, three colors are processed respectively (that is, computation is performed on f(x,y)=$L_{RL}$, f(x,y)=$L_{GL}$, f(x,y)=$L_{BL}$ respectively). Since eight regions are adjacent to the region (already marked in FIG. 4), the backlight brightness compensation value obtained by spatial low-pass smoothing filtering processing in the region is g(x,y)=w1*f(x−1,y−1)+w2*f(x−1,y)+w3*f(x−1,y+1)+w4*f(x,y−1)+w5*f(x,y)+w6*f(x,y+1)+w7*f(x+1,y−1)+w8*f(x+1,y)+w9*f(x+1,y+1), where w1-w9 are weights of the regions, and the specific value of the weights may be designed by persons skilled in the art themselves by experiment and experience. Generally, w1+w2+ . . . +w9=1. It may be understood that three adjacent regions exist for the regions located at four corners of the backlight module 200; and five adjacent regions exist for the regions located at the side of the backlight module 200.

Figure 5:
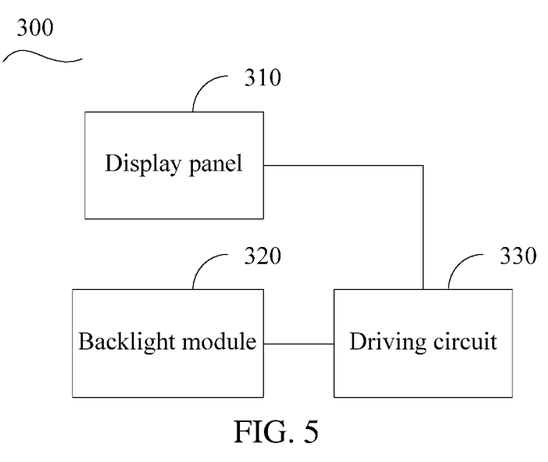
FIG. 5 is a block diagram of a display device in an embodiment.

Referring to FIG. 5, this application further provides a display device 300, including a display panel 310, a backlight module 320 and a driving circuit 330. The display device 300 may be liquid crystal displays of TN (twisted nematic), VA (vertical alignment), OCB (optical compensated bend) and other types, but is not limited thereto. Downright or broadside backlight may be applied as backlight of the liquid crystal display, and the backlight source is an RGB three-color backlight source, a WRGB four-color light source or an RGBY four-color light source. The display device 300 may also be a liquid crystal display with a curved screen.

In some embodiments, the backlight module includes a backlight source and a regional control unit. The backlight source is an RGB three-color backlight source, the backlight source is divided into a plurality of regions by the regional control unit, each region includes three light sources including a red light source, a green light source and a blue light source, and the emergent light brightness of each light source in each region is independently controlled. Pixels in the display panel are divided into blocks in a one-to-one correspondence to the regions of the backlight module. The driving circuit is used for executing the driving method for the display device, and the method may be implemented in match with software stored in a memory of the driving circuit, that is, the method is implemented by the match of software and hardware, and may also be implemented by adopting pure hardware circuits known in the art.

Technical features in the foregoing embodiments may be combined randomly. For the brevity of description, not all possible combinations of various technical features in the foregoing embodiments are described. However, as long as combinations of these technical features do not contradict each other, it should be considered that the combinations all fall within the scope of this specification.

The foregoing embodiments only describe several implementations of this application, which are described specifically and in detail, and therefore cannot be construed as a limitation to the patent scope of the present invention. It should be noted that, persons of ordinary skill in the art may make various changes and improvements without departing from the ideas of this application, which shall all fall within the protection scope of this application. Therefore, the protection scope of the patent of this application shall be subject to the appended claims.

What is claimed is:

1. A driving method for a display device, comprising:
dividing a backlight source of the display device into a plurality of regions, pixels of the display device being divided into blocks in a one-to-one correspondence to the regions of the backlight source; and the backlight source comprises light sources of a plurality of colors;
independently controlling an emergent light brightness of a light source of each color in each of the regions with a regional control unit;
acquiring an input signal of each image frame to be displayed;
displaying each image frame by a front sub-frame and a rear sub-frame, a driving voltage of a pixel of one sub-frame being higher than a driving voltage of a same pixel in another sub-frame;
acquiring a reference backlight brightness signal corresponding to each image frame;
collecting statistics on a maximum signal and a minimum signal of a sub-pixel of each color in the input signal of each image frame in each of the blocks;

respectively acquiring the driving voltage of the maximum signal of the sub-pixel of each color, wherein the driving voltage of one sub-frame is marked as a first driving voltage, and the driving voltage of the other sub-frame is marked as a second driving voltage;

respectively acquiring the driving voltage of the minimum signal of the sub-pixel of each color, wherein the driving voltage of one sub-frame is marked as a third driving voltage, and the driving voltage of the other sub-frame is marked as a fourth driving voltage;

computing backlight brightness compensation signals according to the first driving voltage, the second driving voltage, the third driving voltage, the fourth driving voltage and the reference backlight brightness signal, the higher the driving voltage is, the weaker the backlight brightness compensation signal is, and the lower the driving voltage is, the stronger the backlight brightness compensation signal is, so as to alleviate a brightness difference of a same pixel between the two sub-frames; and adjusting the emergent light brightness of the light source of each color in each region according to the backlight brightness compensation signal.

2. The method according to claim 1, wherein the backlight source is a red-green-blue three-color backlight source.

3. The method according to claim 2, wherein the computing the backlight brightness compensation signal according to the first driving voltage, the second driving voltage, the third driving voltage, the fourth driving voltage and the reference backlight brightness signal performs computation according to the following formulae:

for a red sub-pixel:

$$L_{RL} < L < L_{RH};$$

$$R_{TH} \times L + R_{TL} \times L = R_{TH} \times L_{RL} + R_{TL} \times L_{RH}; \text{ and}$$

$$R'_{TH} \times L + R'_{TL} \times L = R'_{TH} \times L_{RL} + R'_{TL} \times L_{RH};$$

wherein $L_{RL}$ is the sub-frame with relatively weak red sub-pixel backlight brightness compensation signal in two sub-frames of each image frame, $L_{RH}$ is the sub-frame with relatively strong red sub-pixel backlight brightness compensation signal, $R_{TH}$ is the first driving voltage of the red sub-pixel, $R_{TL}$ is the second driving voltage, $r'_{TH}$ is the third driving voltage, $R'_{TL}$ is the fourth driving voltage, and L is the reference backlight brightness signal;

for a green sub-pixel:

$$L_{GL} < L < L_{GH};$$

$$G_{TH} \times L + G_{TL} \times L = G_{TH} \times L_{GL} + G_{TL} \times L_{GH}; \text{ and}$$

$$G'_{TH} \times L + G'_{TL} \times L = G'_{TH} \times L_{GL} + G'_{TL} \times L_{GH};$$

wherein $L_{GL}$ is the sub-frame with relatively weak green sub-pixel backlight brightness compensation signal in two sub-frames of each image frame, $L_{GH}$ s the sub-frame with relatively strong green sub-pixel backlight brightness compensation signal, $G_{TH}$ is the first driving voltage, $G_{TL}$ is the second driving voltage, $G'_{TH}$ is the third driving voltage, and $G'_{TL}$ is the fourth driving voltage; and for a blue sub-pixel:

$$L_{BL} < L < L_{BH};$$

$$B_{TH} \times L + B_{TL} \times L = B_{TH} \times L_{BL} + B_{TL} \times L_{BH}; \text{ and}$$

$$B'_{TH} \times L + B'_{TL} \times L = B'_{TH} \times L_{BL} + B'_{TL} \times L_{BH};$$

wherein $L_{BL}$ is the sub-frame with relatively weak blue sub-pixel backlight brightness compensation signal in two sub-frames of each image frame, $L_{BH}$ is the sub-frame with relatively strong blue sub-pixel backlight brightness compensation signal, $B_{TH}$ is the first driving voltage, $B_{TL}$ is the second driving voltage, $B'_{TH}$ is the third driving voltage, and $B'_{TL}$ is the fourth driving voltage.

4. The method according to claim 3, wherein backlight brightness compensation of the light source of the color in the region is not started when a difference value between the first driving voltage and the second driving voltage of the sub-pixel of each color in each of the regions is not greater than a backlight brightness compensation threshold of the respective color.

5. The method according to claim 1, wherein the adjusting the emergent light brightness of the light source of each color in each region according to the backlight brightness compensation signal is to perform backlight brightness compensation on a next image frame.

6. The method according to claim 1, wherein before the adjusting the emergent light brightness of the light source of each color in each region according to the backlight brightness compensation signal, the method further comprises adjusting the backlight brightness compensation signal of each region so as to alleviate an emergent light brightness difference of adjacent regions.

7. The method according to claim 6, wherein the adjusting the backlight brightness compensation signal of each region is implemented by spatial low-pass smoothing filtering processing.

8. A display device, comprising:
a display panel;
a backlight module, comprising a backlight source and a regional control unit, the backlight source comprises light sources of a plurality of colors, the regional control unit divides the backlight source into a plurality of regions and independently controls an emergent light brightness of each light source in each region, and pixels in the display panel are divided into blocks in a one-to-one correspondence to the regions of the backlight module; and
a driving circuit, comprising:
an input module, configured to acquire an input signal of each image frame to be displayed;
a high and low voltage framing display module, configured to display each image frame by a front sub-frame and a rear sub-frame, a driving voltage of the pixel of one sub-frame being higher than a driving voltage of the same pixel in another sub-frame;
a backlight compensation determination module, configured to determine, according to the driving voltage of the pixel corresponding to each of the regions, amplitude of backlight brightness compensation signals in the two sub-frames respectively corresponding to the light source of each color in each of the regions, the higher the driving voltage is, the weaker the backlight brightness compensation signal is, and the lower the driving voltage is, the stronger the backlight brightness compensation signal is, so as to alleviate a brightness difference of a same pixel between the two sub-frames, wherein the backlight compensation determination module comprises:
an extreme signal statistical unit, configured to collect statistics on a maximum signal and a minimum signal of the sub-pixel of each color in the input signal of each image frame in each of the regions;

a maximum signal acquisition unit, configured to respectively acquire the driving voltage of the maximum signal of the sub-pixel of each color, the driving voltage of one sub-frame is marked as a first driving voltage, and the driving voltage of the other sub-frame is marked as a second driving voltage;

a minimum signal acquisition unit, configured to respectively acquire the driving voltage of the minimum signal of the sub-pixel of each color, the driving voltage of one sub-frame is marked as a third driving voltage, and the driving voltage of the other sub-frame is marked as a fourth driving voltage; and a backlight brightness compensation signal computation unit, configured to compute the backlight brightness compensation signals according to the first driving voltage, the second driving voltage, the third driving voltage, the fourth driving voltage and a reference backlight brightness signal;

a backlight brightness adjustment module, configured to adjust the emergent light brightness of the light source of each color in each region according to the backlight brightness compensation signal; and a reference backlight brightness module, configured to acquire the reference backlight brightness signal corresponding to each image frame.

9. The display device according to claim 8, wherein the backlight brightness compensation of the light source of the color in the region is not started by the backlight compensation determination module when a difference value between the first driving voltage and the second driving voltage of the sub-pixel of each color in each of the regions is not greater than a backlight brightness compensation threshold of the respective color.

10. The display device according to claim 8, wherein the backlight brightness adjustment module adjusting the emergent light brightness of the light source of each color in each region according to the backlight brightness compensation signal is to perform backlight brightness compensation on a next image frame.

11. The display device according to claim 8, wherein the driving circuit further comprises:

a spatial low-pass smoothing filter, configured to adjust the backlight brightness compensation signal of each of the regions so as to alleviate the emergent light brightness of adjacent regions.

12. The display device according to claim 11, wherein the backlight brightness adjustment module adjusts the emergent light brightness of each region according to the backlight brightness compensation signal adjusted by the spatial low-pass smoothing filter.

13. The display device of claim 8, wherein the backlight source is a red-green-blue three-color backlight source.

14. A driving method for a display device, comprising:

dividing a red-green-blue three-color backlight source of the display device into a plurality of regions, pixels of the display device being divided into blocks in a one-to-one correspondence to the regions of the backlight source;

independently controlling the emergent light brightness of the light source of each color in each of the regions with a regional control unit;

acquiring an input signal of each image frame to be displayed;

acquiring a reference backlight brightness signal corresponding to each image frame;

displaying each image frame by a front sub-frame and a rear sub-frame, a driving voltage of the pixel of one sub-frame being higher than a driving voltage of the same pixel in another sub-frame;

collecting statistics on a maximum signal and a minimum signal of the sub-pixel of each color in the input signal of each image frame in each of the regions;

respectively acquiring the driving voltage of the maximum signal of the sub-pixel of each color, the driving voltage of one sub-frame is marked as a first driving voltage, and the driving voltage of the other sub-frame is marked as a second driving voltage;

respectively acquiring the driving voltage of the minimum signal of the sub-pixel of each color, the driving voltage of one sub-frame is marked as a third driving voltage, and the driving voltage of the other sub-frame is marked as a fourth driving voltage; and the backlight brightness compensation signal is computed according to the following formulae:

for a red sub-pixel:

$$L_{RL} < L < L_{RH};$$

$$R_{TH} \times L + R_{TL} \times L = R_{TH} \times L_{RL} + R_{TL} \times L_{RH}; \text{ and}$$

$$R'_{TH} \times L + R'_{TL} \times L = R'_{TH} \times L_{RL} + R'_{TL} \times L_{RH};$$

wherein $L_{RL}$ is the sub-frame with relatively weak red sub-pixel backlight brightness compensation signal in two sub-frames of each image frame, $L_{RH}$ is the sub-frame with relatively strong red sub-pixel backlight brightness compensation signal, $R_{TH}$ is the first driving voltage of the red sub-pixel, $R_{TL}$ is the second driving voltage, $R'_{TH}$ is the third driving voltage, $R'_{TL}$ is the fourth driving voltage, and L is the reference backlight brightness signal;

for a green sub-pixel:

$$L_{GL} < L < L_{GH};$$

$$G_{TH} \times L + G_{TL} \times L = G_{TH} \times L_{GL} + G_{TL} \times L_{GH}; \text{ and}$$

$$G'_{TH} \times L + G'_{TL} \times L = G'_{TH} \times L_{GL} + G'_{TL} \times L_{GH};$$

wherein $L_{GL}$ is the sub-frame with relatively weak green sub-pixel backlight brightness compensation signal in two sub-frames of each image frame, $L_{GH}$ is the sub-frame with relatively strong green sub-pixel backlight brightness compensation signal, $G_{TH}$ is the first driving voltage, $G_{TL}$ is the second driving voltage, $G'_{TH}$ is the third driving voltage, and $G'_{TL}$ is the fourth driving voltage; and for a blue sub-pixel:

$$L_{BL} < L < L_{BH};$$

$$B_{TH} \times L + B_{TL} \times L = B_{TH} \times L_{BL} + B_{TL} \times L_{BH}; \text{ and}$$

$$B'_{TH} \times L + B'_{TL} \times L = B'_{TH} \times L_{BL} + B'_{TL} \times L_{BH};$$

wherein $L_{BL}$ is the sub-frame with relatively weak blue sub-pixel backlight brightness compensation signal in two sub-frames of each image frame, $L_{BH}$ is the sub-frame with relatively strong blue sub-pixel backlight brightness compensation signal, $B_{TH}$ is the first driving voltage, $B_{TL}$ is the second driving voltage, $B'_{TH}$ is the third driving voltage, and $B'_{TL}$ is the fourth driving voltage; and adjusting the emergent light brightness of the light source of each color in each region according to the backlight brightness compensation signal of the light source of each color.

* * * * *